July 19, 1955 R. G. TILLOU 2,713,485
RUBBER CUSHIONING UNITS FOR SHOCK ABSORBERS
Filed May 28, 1952
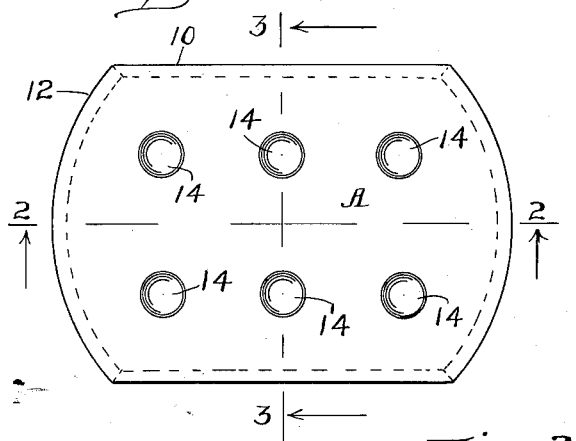
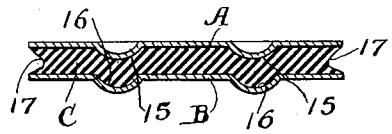
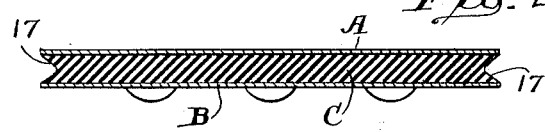
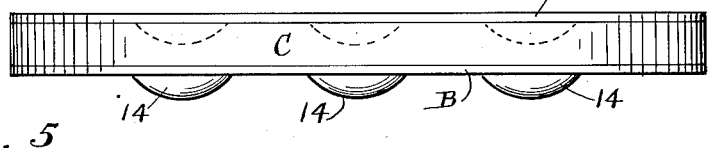
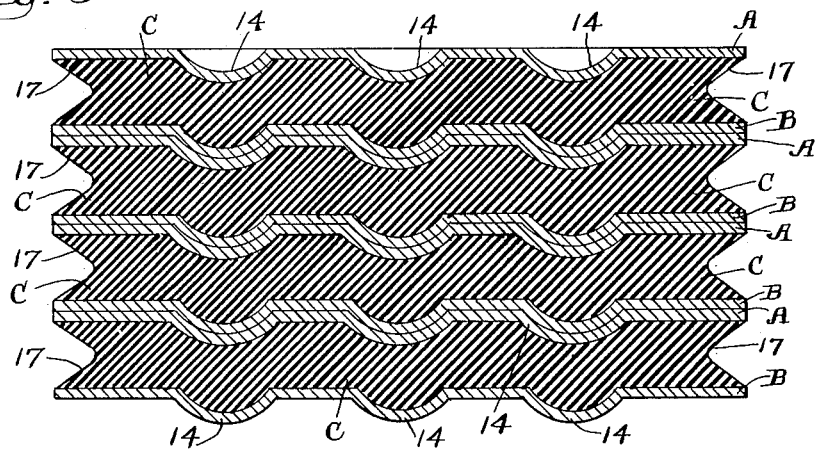
Inventor:
Richard G. Tillou.
By George H. Simmons
Atty.

United States Patent Office 2,713,485
Patented July 19, 1955

2,713,485

RUBBER CUSHIONING UNITS FOR SHOCK ABSORBERS

Richard G. Tillou, Lombard, Ill., assignor to W. H. Miner, Inc., Chicago, Ill., a corporation of Delaware Application May 28, 1952, Serial No. 290,606

4 Claims. (Cl. 267—63)

This invention relates to improvements in rubber cushioning units for shock absorbers.

One object of the invention is to provide a rubber cushioning unit for shock absorbers, comprising a pair of metal plates, and a rubber pad interposed between the plates and vulcanized thereto, wherein the rubber pad corresponds in size to the plates and has the edges thereof indented or grooved in such a manner that the unit may be compressed to a predetermined maximum extent, without any of the material of the pad being projected outwardly beyond the edges of the plates, where the same would be subject to possible damage.

A further object of the invention is to provide a rubber cushioning unit as set forth in the preceding paragraph, wherein the edges of the pad are indented or grooved in such a manner that the material of the pad, in compressed condition, will lie substantially flush with the edges of the plates of said unit.

A still further object of the invention is to provide a rubber cushioning unit for a shock absorbing mechanism composed of a pack or stack of such units, comprising a pair of metal plates, and an interposed rubber pad vulcanized to said plates, wherein the plates at opposite sides of the unit, respectively, have centering projections and seats which inter-engage when said units are assembled in a complete shock absorbing mechanism.

Yet another object of the invention is to provide a shock absorber composed of a plurality of cushioning units arranged in series, wherein each unit is composed of a pair of metal plates and an interposed rubber pad vulcanized to the plates, and wherein the plates and pads of each unit, and the abutting plates of adjacent units of the series are all interlocked by inter-engaging centering projections and seats provided on said plates and pads.

Other objects of the invention will more clearly appear from the description and claims hereinafter following.

In the accompanying drawings forming a part of this specification, Figure 1 is a plan view of my improved rubber shock absorbing unit. Figure 2 is a longitudinal vertical sectional view, corresponding substantially to the line 2—2 of Figure 1. Figure 3 is a transverse vertical sectional view, corresponding substantially to the line 3—3 of Fig. 1. Fig. 4 is a front elevational view of Fig. 1, on an enlarged scale, illustrating the cushioning unit in compressed condition. Fig. 5 is a transverse vertical sectional view of a complete rubber shock absorber, composed of a plurality of the units shown in Figs. 1, 2 and 3.

My improved shock absorbing unit, as shown in the drawings, comprises broadly a pair of metal plates A and B and an interposed rubber pad or mat C. The plates A and B are of similar design, each being of greater length than width. Each plate A and B has parallel spaced side edges 10 and 11 and curved ends 12 and 13. The two plates are thus of generally rectangular form, with their end edges curved. The two plates A and B, as shown in Figures 1, 2, and 3, are of the same size and shape. Each plate A and B is preferably provided with a plurality of indentations 14, which project from one side of the plate and provide seats at the other side. As shown in Figure 2, the seats of the two plates face upwardly and the projections thereof face downwardly.

It will be noted from Figures 1 and 3 that the indentations 14 are arranged in a pattern that is symmetrical with respect to both the longitudinal and the transverse median lines of the plates.

As will be seen best in Figures 1 and 3, each of the indentations 14 and bosses 16 is formed as a section of a sphere, and with the plates A and B positioned with their edges in alignment the bosses and indentations on one plate are in axial alignment with the bosses and sockets in the other plate.

The rubber pad C corresponds in shape and size to the plates A and B and is interposed between the same to provide a rubber cushioning unit. The pad C is provided with a plurality of seats 15 at the upper side thereof, as shown in Figure 3, which receive the projecting portions of the indentations 14—14—14 of the plate A, and projecting bosses 16 at the other or lower side, which are engaged in the seats provided by the indentations 14 of the plate B. The pad C is preferably vulcanized and bonded to the plates A and B with the edges of the plates aligned. The peripheral edges of the pad C are indented or grooved, as indicated at 17. These indentations or grooves are of such a depth and transverse cross section that, when the unit is compressed to a predetermined extent, the material of the pad throughout the height of the edges thereof will be flush or in vertical alignment with the edges of the plates A and B, as shown in Figure 4. In the complete shock absorber shown in Figure 5, the units are held in alignment by the projections of the indentations of the plates B being seated in the seats provided by the indentations of the plates A. Since the indentations 14 in the plates A and B are arranged in symmetrical pattern, seating will be effected as shown even though one of the units is turned through 180 degrees with respect to the other units.

I claim:

1. A shock absorber comprising a plurality of units, each unit consisting of a pair of metal plates and an interposed rubber pad, each of said plates having embossed indentations defining depressed seats on one side and centering projections on the other side, each pad having depressed seats on one side and centering projections on the opposite side thereof, one of said plates of each unit being disposed at the side of the pad having the seats, with the centering projections of said plate seated in the seats of said pad, and the other plate of each of said units being disposed at the side of said pad having the centering projections, with the centering projections of said pad seated in the seats of the last named plate, said pad of each unit being vulcanized to said plates of the unit, said units being arranged in series with the outer sides of the plates of said units in contact with each other with the centering projections and seats on said outer sides of said contacting plates inter-engaged.

2. A shock absorber comprising a plurality of units, each unit consisting of a pair of metal plates and an interposed rubber pad, each pad having depressed seats on one side and centering projections on the other side thereof, each of said plates having embossed indentations, defining depressed seats on one side and centering projections on the other side of said plate, one of said plates of each unit being disposed at the side of the pad having the seats with the centering projections of said plate seated in said seats of said pad and the seats of said plate facing outwardly, and the other plate of each of said units being disposed at the side of said pad having the centering projections with the centering projections of said pad seated in the seats of said last named plate and the centering projections of said plate facing outwardly, the plate of each unit which has the outwardly facing centering projections being engaged with the plate of the adjacent unit having the outwardly facing seats, with said centering projections engaged in said seats.

3. A shock absorber unit for railway draft rigging comprising a pair of imperforate metal plates of generally rectangular shape disposed in spaced apart parallel relation; a solid mass of rubber interposed between said plates in engagement with the entire adjacent faces of the plates and bonded thereto; spaced apart seats of spherical section indented in the plate and rubber on one face of the unit; and spaced apart bosses of spherical section projecting out of the rubber and plate on the other face of the unit, each of said seats being in axial alignment with a corresponding boss.

4. A shock absorber unit for railway draft rigging comprising a pair of imperforate metal plates of generally rectangular shape disposed in spaced apart parallel relation; a mass of rubber interposed between said plates in engagement with the entire adjacent faces of the plates and bonded thereto; spaced apart seats of spherical section indented in the plate and rubber on one face of the unit; spaced apart bosses of spherical section projecting out of the plate and rubber on the other face of the unit, said seats and bosses being arranged in identical patterns that are symmetrical with respect to both the longitudinal and transverse median lines of the unit, each of said seats being in axial alignment with a corresponding boss so that the units may be stacked one upon another in either of two positions with the bosses of one unit registered in the seats of another unit.

References Cited in the file of this patent

UNITED STATES PATENTS

| 1,707,214 | Lord | Mar. 26, 1929 |
| 1,924,504 | Lee | Aug. 29, 1933 |
| 2,160,297 | Thompson | May 30, 1939 |
| 2,175,118 | Hirshfeld | Oct. 3, 1939 |
| 2,260,532 | Lindeman | Oct. 28, 1941 |
| 2,382,569 | Kilborn | Aug. 14, 1945 |

FOREIGN PATENTS

| 440,925 | Great Britain | Jan. 8, 1936 |
| 534,332 | Great Britain | Mar. 5, 1941 |
| 546,525 | Great Britain | July 17, 1942 |
| 762,631 | France | Jan. 22, 1934 |